US008155617B2

(12) United States Patent
Magnusson et al.

(10) Patent No.: US 8,155,617 B2
(45) Date of Patent: Apr. 10, 2012

(54) LIGHTWEIGHT MRRM WITH RADIO AGNOSTIC ACCESS SELECTION IN THE CORE NETWORK

(75) Inventors: Per Magnusson, Linköping (SE); Joachim Sachs, Aachen (DE); Johan Lundsjö, Spånga (SE); Mikael Prytz, Rönninge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 929 days.

(21) Appl. No.: 12/090,148

(22) PCT Filed: Dec. 29, 2005

(86) PCT No.: PCT/SE2005/002056
§ 371 (c)(1),
(2), (4) Date: Apr. 14, 2008

(87) PCT Pub. No.: WO2007/043927
PCT Pub. Date: Apr. 19, 2007

(65) Prior Publication Data
US 2008/0256260 A1 Oct. 16, 2008

(30) Foreign Application Priority Data

Oct. 14, 2005 (WO) .................. PCT/SE2005/001544

(51) Int. Cl.
*H04B 1/16* (2006.01)
(52) U.S. Cl. ....................... 455/336; 455/452.2; 455/439
(58) Field of Classification Search .......... 455/436–439, 455/442–443, 450–452.2; 370/331, 335–337
See application file for complete search history.

(56) References Cited

U.S. PATENT DOCUMENTS

| 5,444,766 A | 8/1995 | Farwell et al. |
| 7,826,796 B2 | 11/2010 | Matsunaga |
| 2006/0073836 A1* | 4/2006 | Laroia et al. ................ 455/450 |
| 2009/0156211 A1* | 6/2009 | Hande et al. ................ 455/436 |

FOREIGN PATENT DOCUMENTS

JP 2004-120080 A 4/2004

OTHER PUBLICATIONS

"D 2.4 Multi-Radio Access Architecture"; Sixth Framework Programme, Ambient Networks, Dec. 22, 2005, retrieved on Sep. 18, 2006 from the internet: http://www.ambient-networks,org/publications/D%202.4%20Multi-Radio%20Access%20Architecture%20Final%20Report)PU.pdf#search=%22draft%20multi-radio%20access%20architecture%22; sections 4.3-4.5.

* cited by examiner

*Primary Examiner* — Christian Hannon

(57) ABSTRACT

A method and arrangement for making a handover decision in a multi-access communication network is disclosed. A first set of criteria is determined for when a handover between at least two access paths should be performed and a report is sent when at least one criterion of a first set of criteria is fulfilled. A second set of criteria is determined for when a handover between said at least two access paths should be performed and a report is sent when at least one criterion of said second set of criteria is fulfilled. One or more data sessions of at least one user terminal network are determined to be handed over based on the sent reports and a core network anchor and a terminal anchor are directed to execute a handover by re-routing said determined data sessions from one access path to an alternative access path.

24 Claims, 7 Drawing Sheets

LIGHTWEIGHT MRRM WITH RADIO AGNOSTIC ACCESS SELECTION IN THE CORE NETWORK

TECHNICAL FIELD

The present invention relates to the field of multi-access communication networks and, particularly, to an arrangement allowing for making a handover decision in a multi-access communication network as well as a method for such decision. The invention further relates to a computer program product for performing the method.

BACKGROUND OF THE INVENTION

It has been shown in several studies that joint management of different radio access technologies, such as multi-radio resource management (MRRM) can bring substantial gain to network capacity and user performance in a multi-access network. Generally, implementation of MRRM optimizes the usage of resources and minimizes the costs. However, such MRRM algorithms require access specific knowledge, e.g. the capacity and load in different radio cells belonging to different access technologies, and the link characteristics and quality for different access links of a user. For this reason, most MRRM studies suggest an architecture, where (one or more) MRRM functions collect all required access resource information of the different access technologies to determine the best allocation of users to access technologies. From that perspective, multi-access is achieved by connecting multiple different access networks to a common multi-access network.

In most standardisation activities the approach of multi-access integration differs from the previous described approach. There, it is instead assumed that different access networks remain independent and are connected to a common core network.

An exception is the concept of Common Radio Resource Management (CRRM) inter-system handover between the GSM/EDGE Radio Access Network (GERAN) and the Universal Terrestrial Radio Access Network (UTRAN) discussed and partly specified by the third Generation Partnership Project (3GPP).

In the prior art all access specific knowledge is supposed to remain within each access network and the core network is supposed to stay agnostic of any radio- or access specific knowledge, or load information on individual cell level is handled in a CRRM server that is shared between two radio access networks, which is one of the solutions discussed in 3GPP.

There are several reasons for keeping the core network agnostic to access-level information. One is, for example, the problem of scalability if access knowledge on cell level, or even at finer granularity, would be exported into the core network. Another reason is that use of the core network may be extended to new access technologies, as it does not need to be aware of access technology specifics. A further reason is that the core network may belong to another operator (administrative domain), whereby access specific information is not desired to be exposed to the core network. Consequently, the gains of MRRM cannot be easily achieved in an approach combining different access technologies in the core network.

SUMMARY OF THE INVENTION

Accordingly, it is an objective with the present invention to provide an improved method for making a handover decision in a multi-access communication network comprising a core network and at least one user terminal network communicating with said core network on at least two access paths via at least two access networks, whereby data sessions are routed on at least a first access path via a first access network and a second access path via a second access network.

This objective is achieved through a method comprising the steps of: determining a first set of criteria for when a handover between said at least two access paths should be performed; sending a first report when at least one criterion of said first set of criteria is fulfilled; determining a second set of criteria for when a handover between said at least two access paths should be performed; sending a second report when at least one criterion of said second set of criteria is fulfilled; determining one or more data sessions of said at least one user terminal network to be handed over based on at least one of the sent first and second report; and, executing a handover by re-routing said determined data sessions from one access path to an alternative access path.

Another objective of the present invention is to provide an improved arrangement for making a handover decision in a multi-access communication network comprising a core network and at least one user terminal network communicating with said core network on at least two access paths via at least two access networks, whereby data sessions are routed on at least a first access path via a first access network and a second access path via a second access network.

This other objective is achieved through providing an arrangement comprising: means for determining a first set of criteria for when a handover between said at least two access paths should be performed; means for sending a first report when at least one criterion of said first set of criteria is fulfilled; means for determining a second set of criteria for when a handover between said at least two access paths should be performed; means for sending a second report when at least one criterion of said second set of criteria is fulfilled; means for determining one or more data sessions of said at least one user terminal network to be handed over based on at least one of the sent first and second report; and, means for executing a handover by re-routing said determined data sessions from one access path to an alternative access path.

A further objective of the present invention is to provide a computer program product, which is directly loadable into the internal memory of a digital computer, and which comprises a computer program for performing the method when said program is run on said computer.

Thanks to the provision of distributed access selection functionality onto a number of different entities, the gains of MRRM is achieved, while allowing the common network nodes to remain agnostic of access specifics that are part of the MRRM algorithm. Thus, a lightweight and scalable realisation of MRRM is provided, which provides access selection outside the access networks and where access selection can be located in the core network, in an independent network, or even in a user terminal network.

The arrangement and the method according to the present invention may be used to provide multi-access resource management within the multi-access approach currently defined within 3GPP System Architecture Evolution.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF PREFERRED EMBODIMENTS

This invention strongly applies to access technologies and access networks based on radio transmission (e.g. wireless, mobile or cellular networks). However, this invention also applies to other access technologies and access networks (e.g. fixed access). Although the description of this invention sometimes refers to radio access, radio technology, radio resource management, radio access network etc, it can be applied to any kind of access technologies and access networks.

Figure 1:
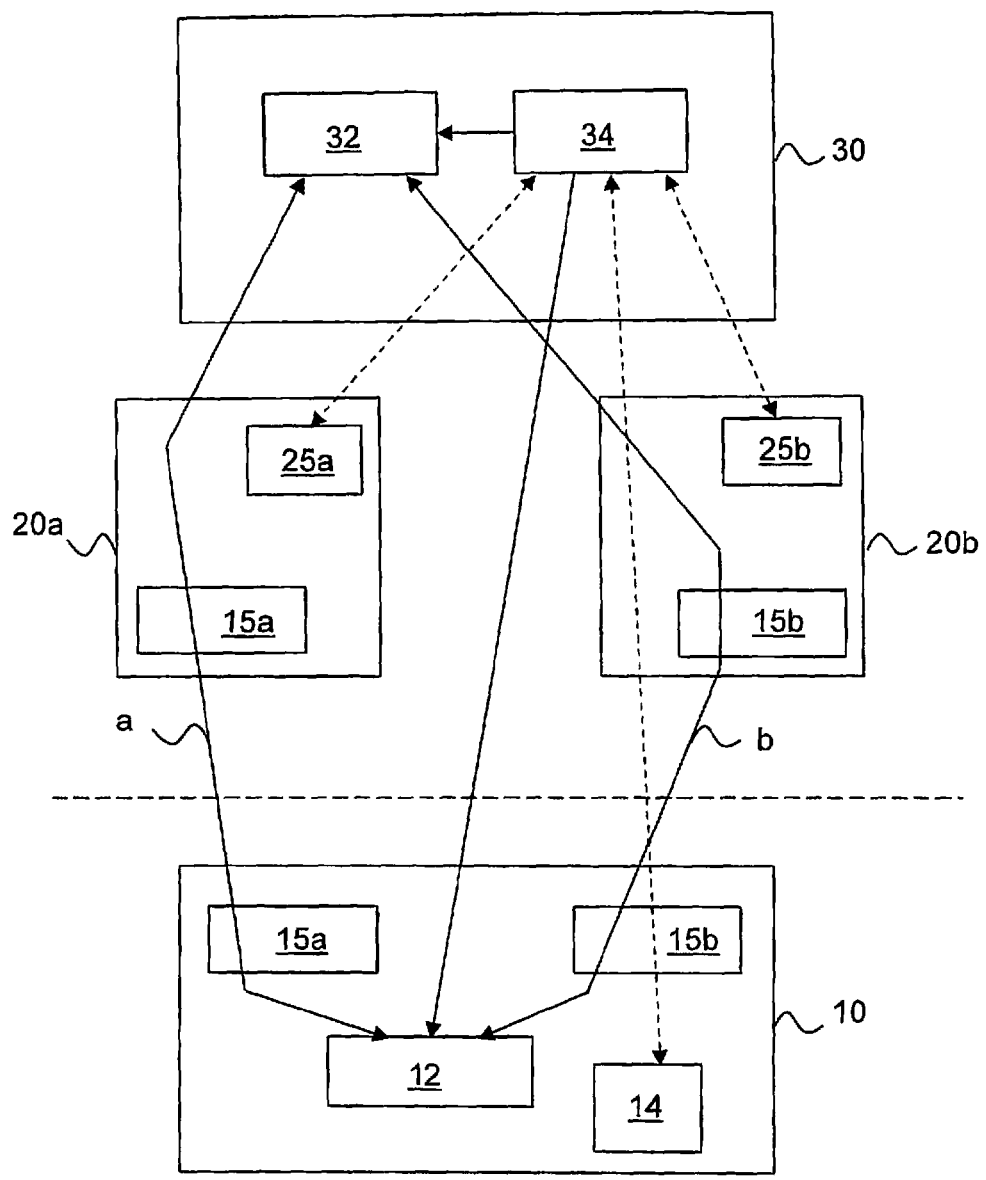
FIG. 1 shows a schematic block diagram over the network architecture with an access selection functionality distribution according to one embodiment of the present invention.

FIG. 1 shows a User Terminal Network, UTN, 10 which is within the coverage of a first access network 20a and a second access network 20b and has two access paths a, b to the core network 30. The access paths a and b connects a core network anchor 32 and a terminal anchor 12. Each access path a, b goes via one access network (AN) 20a, 20b and comprises at least one transmission link 15a, 15b. In Radio Access Networks, the link 15a, 15b is also called Radio Access (RA). The core network anchor 32 and the terminal anchor 12 are arranged to route data of the UTN data sessions to a selected access path a and/or b.

The UTN 10 may be a single device or a complete network that is connected to the core network 30 via fixed or wireless access. It could be, e.g., a personal area network, consisting of several devices that are interconnected via some short-range communication. It could also be a larger network connected via a common gateway to the wireless network. What is important, is that the UTN 10 can be identified by the core network 30, e.g., by means of an access identifier.

The main idea of this invention is to distribute the access selection functionality onto a number of different entities. The final access selection decision is taken in an entity called Access Selection Function (ASF) 34, and it is not directly based on access specific knowledge, cell level topology/load information, nor access specific link measures. The access-specific part of access selection is provided by two other functions. Each user terminal—or more general, User Terminal Network (UTN) 10 in case of multiple connected devices—contains a Connection Management Function (CMF) 14, which determines the availability of different access links 15a, 15b, the characteristics of the access links 15a, 15b, as well as, the resource usage associated with each access link 15a, 15b. Almost each access network 20a, 20b further contains an Access Network Control Function (ANF) 25a, 25b which determines the load and capacity of radio cells, the characteristics of access links 15a, 15b and for each user terminal network 10, the resource costs of an access link 15a, 15b. However, there might be access networks that do not comprise an ANF, e.g. fixed access networks. The ANF 25a, 25b and CMF 14 manage in a preferred embodiment of the present invention the access specific part of an MRRM algorithm in a distributed manner. Only if critical situations are detected in either of the access networks 20a, 20b or the user terminal network 10, the ASF 34 is triggered with sufficient (still access agnostic) information to make access selection decisions.

A common realization is that ASF is part of the Core Network Anchor. But, according to the present invention it is described here as a separate function that may be located in a separate node as depicted in FIG. 1, but may as well be located in another network. As can be seen in FIG. 1, the ASF 34 is communicating with the ANFs 25a, 25b and the CMF 14 by receiving information reports and sending requests of updated reports (shown with broken arrows) and, is controlling the core network anchor 32 and the terminal anchor 12 (shown with continuous arrows) to perform the selected handovers.

Figure 2:
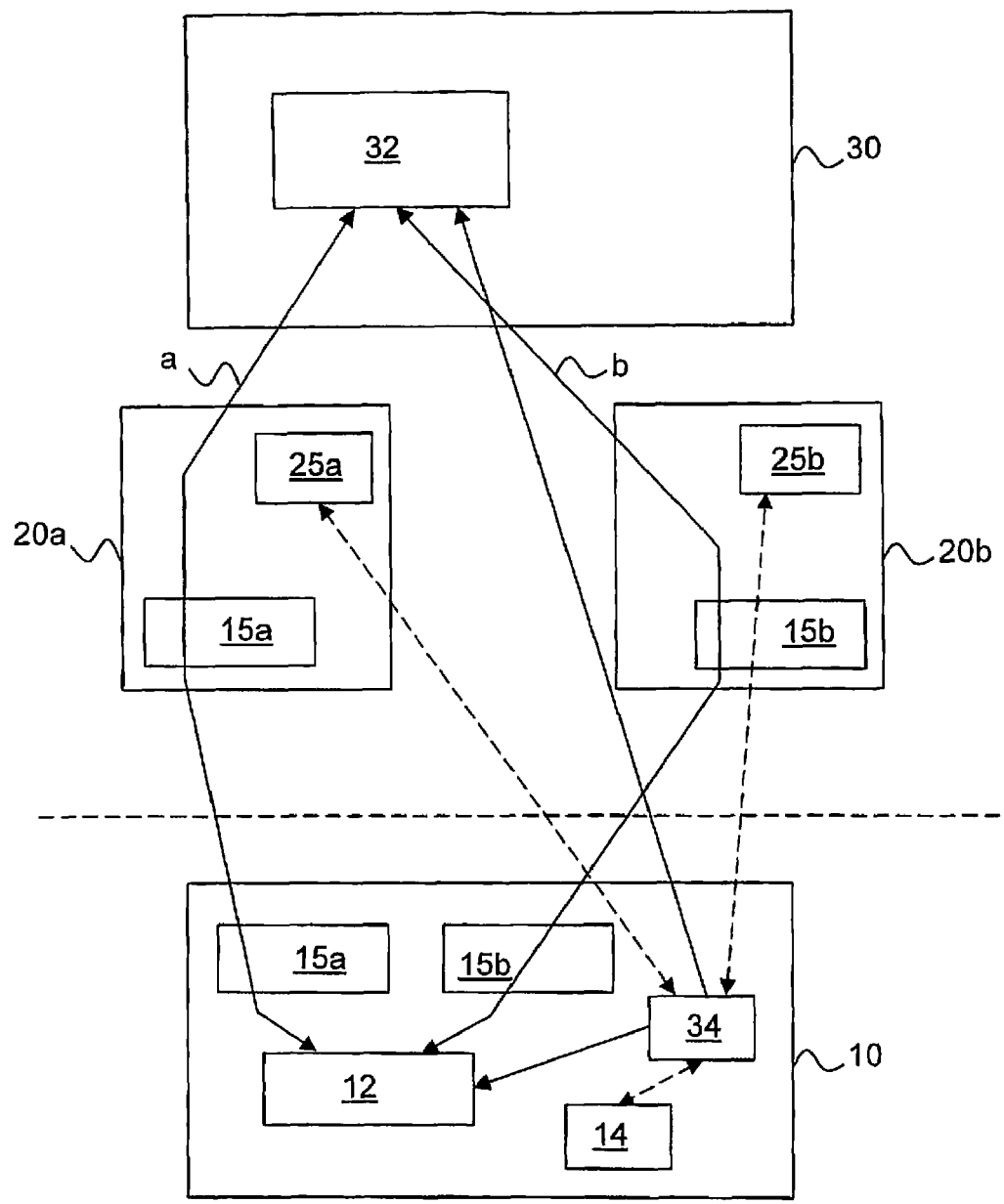
FIG. 2 shows a schematic block diagram over the network architecture with an access selection functionality distribution according to another embodiment of the present invention.

FIG. 2 shows another embodiment of the present invention, in which the ASF 34 is implemented in the user terminal network 10 instead of in the core network 30. Thus, FIG. 2 shows a UTN, 10 which is within the coverage of a first access network 20a and a second access network 20b and has two access paths a, b to the core network 30. The access paths a and b connects a core network anchor 32 and a terminal anchor 12. Each access path a, b goes via one access network 20a, 20b and comprises at least one transmission link 15a, 15b. The core network anchor 32 and the terminal anchor 12 are arranged to route data of the UTN data sessions to a selected access path a and/or b. The ASF 34 is communicating with the ANFs 25a, 25b and the CMF 14 by receiving information reports and sending requests of updated reports (shown with broken arrows) and is controlling the core network anchor 32 and the terminal anchor 12 (shown with continuous arrows) to perform the selected handovers.

For simplicity, FIGS. 1 and 2 show only one UTN 10 and two access networks 20a and 20b. However, the multi-access system may of course comprise several access networks and comprises usually a plurality of user terminal networks. Alternatively, the system comprises a single access network comprising different access nodes for different access technology or, even, the same access technology. One or more UTNs may connect to at least two of these nodes/technologies, independent of which access network/access technology they relate to, in such a way that they overlap in coverage. The access nodes do not coordinate access selection among each other, this is done by the ASF. So, there are at least two access paths which are not directly coordinated by the involved access nodes. In this context, at least two access networks should be understood to mean at least two separate access networks, at least two access nodes in an access network or a combination thereof.

The access network function 25, the connection management function 14 and the access selection function 34, will now be described in greater detail.

Access Network Function (ANF)

Figure 3:
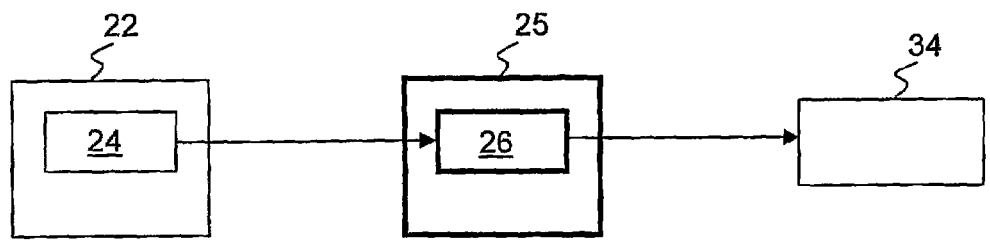
FIG. 3 is a schematic block diagram over an exemplary hardware implementation of an Access Network control Function (ANF) node.

The Access Network Function 25, shown in FIG. 3, performs the following functions:

- observing the performance (e.g. data rate, delay, delay jitter, error rate) of an access path a or b (shown in FIGS. 1 and 2). In many systems the performance and resource efficiency of an access path is dominated by a few hops, typically the first hops connecting the UTN to the fixed network. In these cases it is common, that not the performance and resource efficiency of the complete access path is observed, but instead only the performance and resource usage of the dominating hops are used as a measure for the complete access path. Examples for such systems are wireless networks, multi-hop networks or narrow-band fixed access networks; in all these cases the performance of the access path is determined largely by the performance of the first access hops;
- observing the resource usage (e.g. transmission power, processing power and memory usage) for an access path;
- monitoring the fulfillment of the required service performance for data sessions;
- observing if new access paths are detected and/or established;
- observing if access paths are lost or disconnected;
- observing the resource usage/load of the access network (e.g. traffic load in the transport network, traffic load in different cells, capacity/usage/efficiency of access specific resources {transmission power, processing power, used time slots/codes/carriers}, queue fill states, cell interference) and variations of the usage;
- updating the ASF 34 with "critical" information related to access paths in so-called ANF report messages. These ANF reports can be sent event-triggered, e.g. whenever a critical situation as defined below is detected or ceases to be critical, or periodically, or in a combination of periodic and event-triggered reporting.

The access network comprises an access network control node 22 containing measurement and control functions 24, which give input to an ANF processor 26 located in the ANF node 25. The input given is access specific information, such as cell load and available resources, link quality, processing load, etc. An optional input is a request from the ASF to send updated ANF message.

The Access Network Function 25 defines a first set of criteria for "critical" situations that may trigger a handover:

1. If the cell load or number of available resources becomes critical (e.g. exceeding or falling below a threshold value);
2. If the processing load or AN transmission network load becomes critical (e.g. exceeding or falling below a threshold value);
3. If for a user terminal the handovers becomes critical (e.g. exceeding or falling below a threshold value);
4. If the link quality of an access link becomes critical (e.g. exceeding or falling below a threshold value), a Quality of Service (QoS) requirement cannot be met, or the resource costs for an access link become too expensive.

A handover may be triggered if a situation becomes "critical" but may as well be triggered if the situation stops to be critical.

A handover is in this context defined as switching at least one data session belonging to a user terminal network from one access path to another access path.

The critical situations 1 and 2 apply for all user terminal networks that are affected by the critical situation, e.g. all UTNs within the overloaded cell (in case of 1) or all UTNs connected to the overloaded network and/or network node (in case of 2). The critical situations 3 and 4 apply for certain data sessions of a specific UTN, or the UTN as a whole.

If such a critical situation is detected or the critical situation becomes uncritical again, the ANF 25 reports to the Access Selection Function (ASF) 34 in an ANF report. This report does not contain access specific information, which would require an understanding of the details of the access technology. It only contains, a list of user terminal network identifiers which are affected by the "critical (e.g. overload) situation" and, thus, become potential candidates for a handover action. It possibly also contains session flow identifiers in case only certain data sessions of a user terminal network are to be considered for a handover. It is also possible that the message contains an area identifier, describing in which area of the AN an overload occurs. Some form of location (possibly in an AN specific form like location area identifier) is available in the core network and ASF, e.g. for reachability of the user terminal network. An area identifier allows the ASF to identify all UTNs that are affected by the critical situation. Such an ANF report could e.g. indicate "there is an overload in cells {x,y} of AN A", and the ASF could identify the user terminals which are located in this area. Alternatively, if an overload situation affects a certain area, the ANF function could translate the area information into a list of UTN that are located in this area. The ANF report then only contains the UTN identifiers. The ANF report may further contain a type field, indicating the type of critical situation, with access specifying parameters. The ANF report may comprise an indication of the how critical the situation is, e.g. in a scale from 0-100.

In case that the ANF translates overload related to an area into an ANF report message that lists individual UTNs/data sessions, the ANF may apply some filtering depending on how critical the situation is. For example, if the load of a cell only slightly exceeds a load limit, the ANF can select only a limited subset of the affected UTNs in the cell, and report only an ANF report for this limited subset of UTNs to the ASF. For determining the subset, access specific information can be used, e.g. to select the UTNs which require comparatively high resources for a certain transmission performance. A realization could be, that the ANF selects a list of UTNs to be reported, sorted according to some criteria (like resource consumption, priority, etc.) and indicates how many or what percentage of the listed UTNs should be handed over. The ASF can then make the selection based on the ANF information report.

Further, the resource costs of the UTNs may be weighted in the ANF report. E.g. the ANF report could report 4 UTNs with resource weight W assigned {UTN1, W1=7}, {UTN2, W2=3}, {UTN3, W3=2}, {UTN4, W4=2}. If there is a need for a resource cost reduction of a total weight of 7, the ASF may achieve this demand by either select only UTN1 or select the other three UTNs (UTN1+UTN2+UTN3).

Typically the ANF is collocated or integrated with the access network specific control node which manages the access resources (e.g. UMTS radio network controller, WLAN Access Point Controller, etc).

Connection Management Function (CMF)

Figure 4:
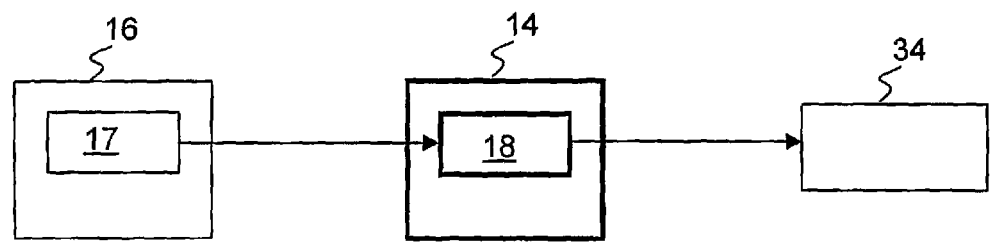
FIG. 4 is a schematic block diagram over an exemplary hardware implementation of a Connection Management Function (CMF) node in a User Terminal Network (UTN)
Figure 5:
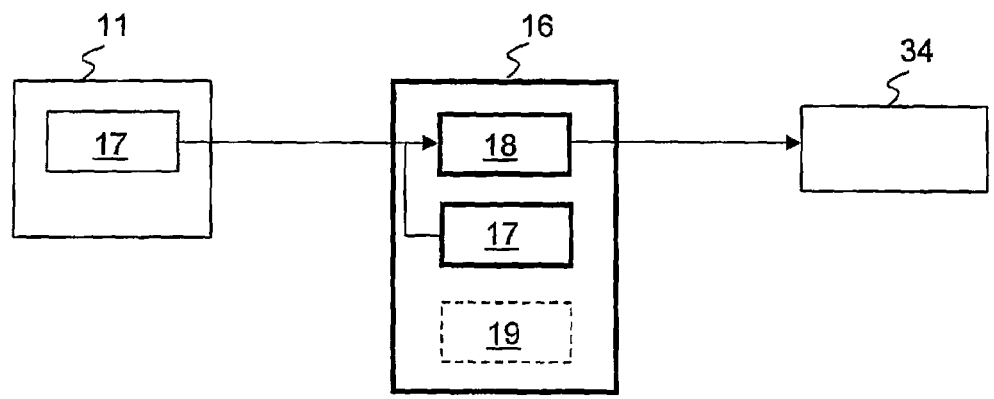
FIG. 5 is a schematic block diagram over an exemplary hardware implementation of the Connection Management Function (CMF) node in a User Terminal Network (UTN) device.

The Connection Management Function 14, shown in FIGS. 4 and 5 performs the following functions:

observing the performance (e.g. data rate, delay, delay jitter, error rate) of an access path a or b. In many systems the performance and resource efficiency of an access path is dominated by a few hops, typically the first hops connecting the UTN to the fixed network. In these cases it is common, that not the performance and resource efficiency of the complete access path is observed, but instead only the performance and resource usage of the dominating hops are used as a measure for the complete access path. Examples for such systems are wireless networks, multi-hop networks or narrow-band fixed access networks; in all these cases the performance of the access path is determined largely by the performance of the first access hops;

observing the resource usage (e.g. transmission power, processing power and memory usage) for an access path a or b;

monitoring the fulfillment of the required service performance for data sessions;

observing if new access paths are detected and/or established;

observing if access paths are lost or disconnected;

updating the ASF with "critical" information related to access paths in so-called CMF report messages. These CMF reports can be sent event-triggered, e.g. whenever a critical situation as defined below is detected or ceases to be critical, or periodically, or in a combination of periodic and event-triggered reporting.

The CMF 14 may be a separate node in the UTN as shown in FIG. 4, in which a CMF processor 18 located in the CMF node 14 receive input from measurement and control functions 17 comprised in a UTN device 16. Received input may be performance of available access paths, resource usage of available access paths, changes in available access paths, handover events, etc. Optionally, the CMF processor 18 receives a request from the ASF 34 to send an updated CMF message.

Alternatively as shown in FIG. 5, The CMF 14, i.e. the CMF processor 18 is implemented in a UTN device 16 comprising measurement and control functions 17, which gives input to the CMF processor 18, and also other user terminal functionalities 19. The CMF processor 18 may also receive input from measurement and control functions 17 comprised in another UTN device 11. Received input may be performance of available access paths, resource usage of available access paths, changes in available access paths, handover events, etc. Optionally, the CMF processor 18 receives a request from the ASF 34 to send an updated CMF message.

The CMF defines a second set of criteria for "critical" situations for one or more data sessions of a UTN or the UTN as a whole that may be relevant for a handover decision:

If the access link quality of one or more access links changes;

If a new access link is detected;

If a service requirement cannot be met by the current access link;

If too many handovers occur at the current access technology;

If the resource costs (processing, battery, power, price of usage) are too high;

If large interference is detected for an access link.

A handover may be triggered if a situation becomes "critical" but may as well be triggered if the situation stops to be critical.

If such a critical situation is detected (or a situation stops to be critical), the CMF reports this to the Access Selection Function (ASF) 34 in a CMF report message. This CMF report contains user terminal network identifiers, and possibly session flow identifiers (if only some sessions are to be handed over), identifying for which UTNs/sessions the critical situation applies. Further, it contains what type of critical situation has been detected (e.g. from the above list) and possibly further parameters specifying the situation. These parameters do not contain access specific information valid only for a certain type of access technology. Instead some access-agnostic information is used. This may e.g. be parameters specified in access-agnostic units (expected data rate in kb/s; delay in ms, etc.) or parameters given in a normalized measure, e.g. normalized in a range from 0-100. The CMF report message may further comprise an indication of the how critical the situation is, e.g. in a scale from 0-100.

In addition the CMF informs ASF when new access links are detected and when these access links are established.

Access Selection Function (ASF)

Figure 6:
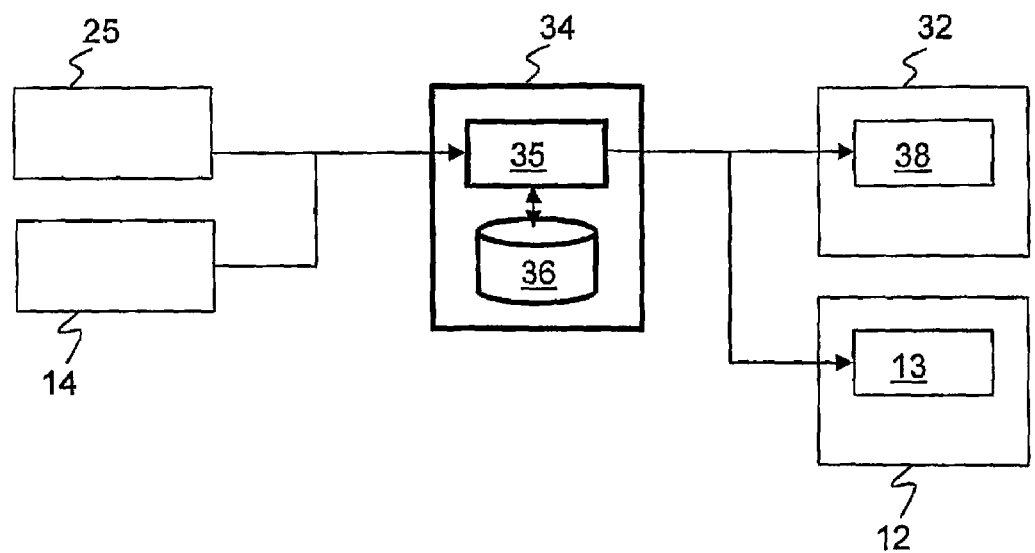
FIG. 6 is a schematic block diagram over an exemplary hardware implementation of an Access Selection Function (ANF) node.

The Access Selection Function 34, shown in FIG. 6, manages an ASF database 36 for multiple user terminal networks. In this database 36 the following information is stored for each UTN:

UTN identifier;

List of access paths for this user terminal network. For each access path the following information is stored:

Optionally: identifier of core network anchor and terminal anchor used for this access path and the corresponding access path routing method (e.g. mobile IP; hierarchical mobile IP; mobility and multi-homing protocol (MOBIKE); GPRS Tunnelling Protocol (GTP));

Access path identifier. This can be, for example, a locator (e.g. IP care of address for mobile IP; tunnel endpoint identifier; or a combination of: RAN identifier, RAN access node identifier and RAN specific UTN identifier);

Optionally: type of access used for access path (e.g. WLAN, GPRS, UMTS, HSPA, DSL, Ethernet);

Characteristics of access path, like e.g., peak rate, average rate, delay, security support, QoS support. The characteristics parameters can have a time stamp associated to them, indicating when the last update of a parameter was made;

Optionally: area identifier;

Optionally: marker indicating that the access path is marked as critical. The marker can have an associated time stamp (showing when the access path was marked as critical) and a time period (indicating how long this marking is valid);

Optionally: handover frequency.

List of sessions. For each session the following information is stored:

Session requirements, e.g. QoS requirements (delay, rate, etc.); security requirements;

Active access path(s). A session may be also mapped to multiple access paths in parallel.

It may be that all sessions of a UTN shall always be mapped to the same access path. In this case this information does not need to be stored per session but only for the UTN as such.

The task of the ASF is to:

Select the best suited access path for UTNs. Hereby the sessions of UTNs are mapped to access paths;

Update the core network anchor and user terminal anchor accordingly, such that the binding of session flows to access paths is set accordingly;

Receive information from ANFs and CMFs which is relevant for the access path selection function;

Query information from ANFs and CMFs, which report back to the ASF information that is relevant for the access path selection function;

Update the ASF database accordingly when information is received by CMFs (CMF report) and/or ANFs (ANF report);

Update the ASF database when a handover of access paths is decided.

In order to be able to achieve the task, a ASF processor 35 located in the ASF node 34 receives input from the ANF 25 and the CMF 14.

When the ASF receives an ANF report from an ANF 25 or a CMF report from a CMF 14 it performs the following functions:

It identifies all possibly affected UTNs and sessions. Affected UTNs and sessions can be explicitly listed within the message. Also an area identifier can be included in the message, indicating that all UTNs with an access path related to this area identifier are affected;

It identifies for affected UTNs/sessions possible handover options, i.e. possible alternative access paths are identified. A special form of handover is, if a terminal does not have an alternative access path. If a request by ANF is received to make a handover for this user (e.g. since he uses too much access resources) his session may be dropped. A pre-emption by ANF may not be feasible, since each ANF does not know if alternative access paths for this UTN exist;

Establish a list of all possible handover options for all affected UTNs/sessions;

Optionally: request from ANF and/or CMF information status of candidate access paths. For candidate access paths some parameters may not have been updated recently (which can be determined from a time stamp associated with each parameter update);

Sort the list of possible handover actions in priority order, based on a combination of (at least some of) the following criteria:

Policies (user subscription). Some users may have a premium subscription, which allows them to be served at a higher quality level and/or higher priority;

Availability of alternative access paths for this user terminal network;

Service requirement and capabilities of alternative access path;

Severity of action for this UTN/session. The severity can be defined to what extent the session requirements are met. If even minimum requirements are not met a handover is classified as very severe. Similarly, if no alternative access path exists and the only possible handover is to drop the session this is classified as very severe. Session requirements can be QoS-related as well as other requirements, like security requirements.

Perform the handover from that list in order of priority until a threshold of required actions is met.

Often a handover decision is triggered when the access path characteristics for a single UTN change (this can be triggered by CMF or ANF). In this case, the sorted list of handover actions lists the possible handover options for this UTN, where the first element gives the handover to the "best" alternative access path. If a handover decision is triggered when the load of a certain cell passes a threshold, the sorted list of handover actions lists possible handover options for all UTNs located in the overloaded cell. In this case it is not required that all UTNs perform a handover, but only a number of UTNs such that the total cell load decreases again. How many UTNs need to perform a handover can be determined from a parameter in the ANF report, which tells how critical the load situation is. This parameter can e.g. indicate, what percentage of the UTNs affected by this ANF report shall be handed over.

The handover execution is performed by directing the Core Network Anchor 32 and User Terminal Network Anchor 12 nodes to perform the handover. I.e. access path switching functions 38 and 13 in the core network anchor 32 and the UTN anchor 12 respectively, receives output from the ASF processor 35 about the handover. The Core Network Anchor 32 and UTN Anchor 12 may both support different procedures/protocols for performing a handover, e.g. based on Mobile IP, GTP, a local binding, etc. The appropriate procedure and corresponding access path identifiers are provided by ASF.

A first set of criteria for when a handover between at least two access paths should be performed is determined by the ANF and a second set of criteria for when a handover between at least two access paths should be performed is determined by the CMF. There may further be a third set of criteria for when a handover between at least two access paths should be performed, e.g. when a policy rule changes. This could be:

a UTN has used up all credits for using a certain access network or access technology;

the authorization for usage of an access network or access technology has been revoked;

the user priority has changed;

the access networks change their rules of sharing resources with other access networks;

the price of usage for an access network has changed.

Figure 7:
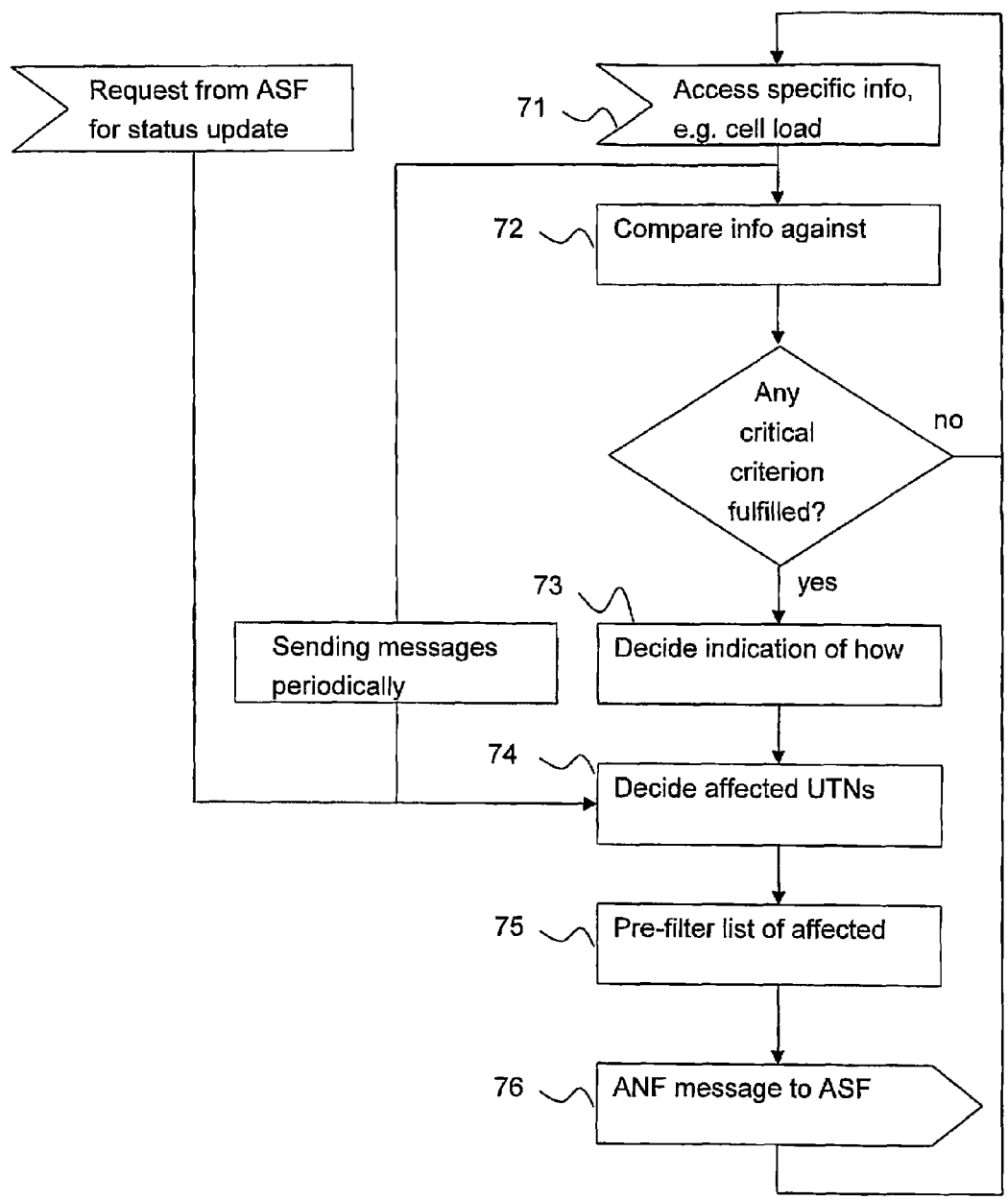
FIG. 7 is an exemplary flowchart showing the steps taken in the Access Network Function (ANF) node.

In a preferred embodiment of the present invention, the procedure in the Access Network Function (ANF), shown in FIG. 7, is as follows:

receiving access specific information, such as cell load and available resources, processing load and link quality from the access network control node (step 71);

comparing the received information against criteria for "critical" situations (step 72), i.e. if the cell load or number of available resources becomes critical, if the processing load or AN transmission network load becomes critical, if for a user terminal the handover frequency becomes critical or if the link quality of an access link becomes critical;

if no critical criterion is fulfilled, going back to step 71;

if any critical criterion is fulfilled, determining an indication of how critical the situation is (step 73);

determining affected UTNs and possibly relevant sessions of a UTN (step 74) and deriving a list of affected UTNs and/or sessions;

optionally, pre-filtering derived list of affected UTNs and/or sessions (step 75);

sending ANF message to ASF containing relevant UTNs and/or sessions (possibly pre-filtered), area identifiers and, an indication of how critical the situation is;

if the ANF receives a request from the ASF for an update message or if the ANF message is periodically sent to the ASF, performing steps 74-76 as shown on the left hand side of FIG. 7.

Figure 8:
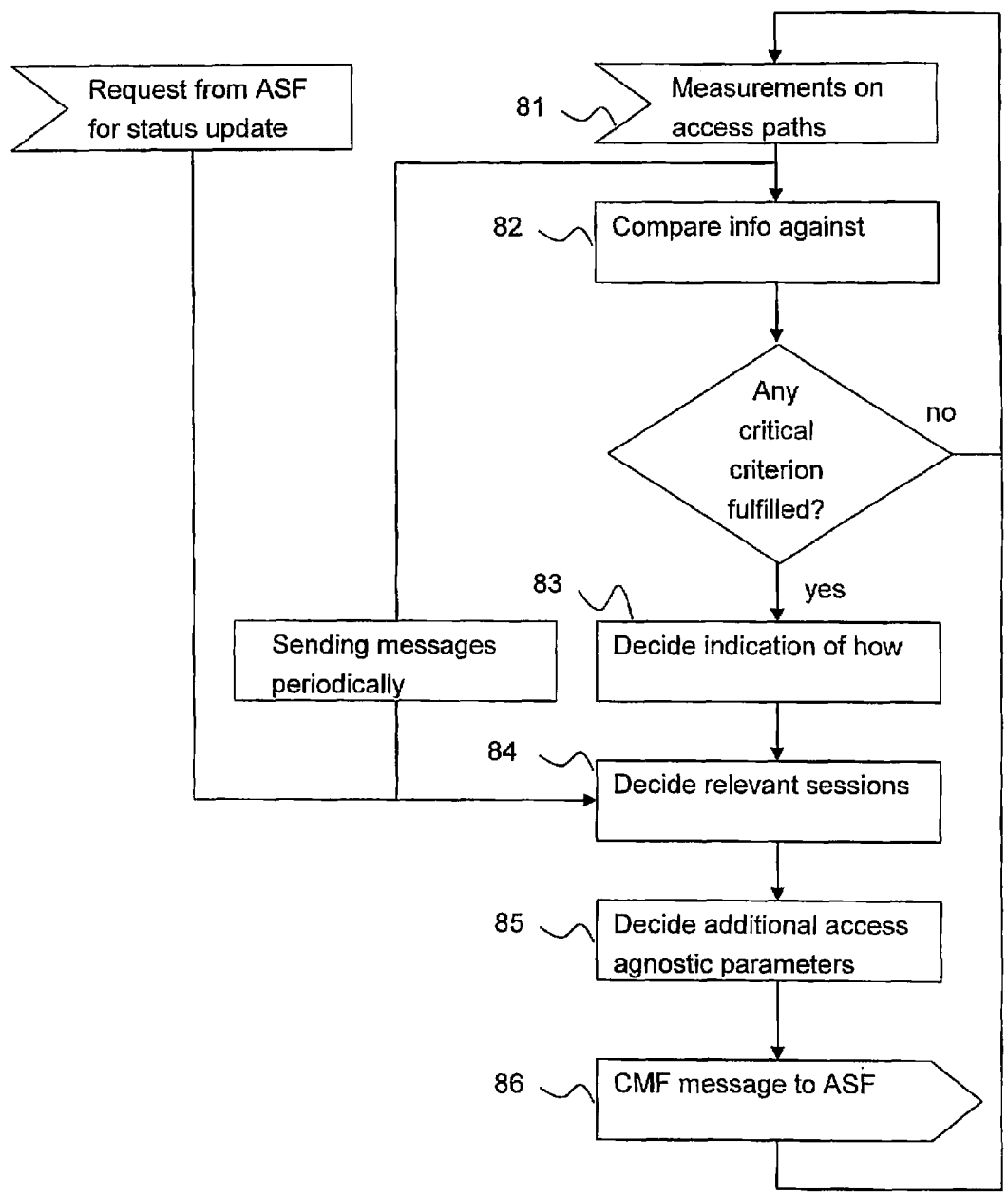
FIG. 8 is an exemplary flowchart showing the steps taken in the Connection Management Function (CMF) node.

In a preferred embodiment of the present invention, the procedure in the Connection Management Function (CMF), shown in FIG. 8, is as follows:

receiving measurements on access paths, such as performance, resources and events (step 81);

comparing the received information against criteria for critical situations (step 82), i.e. if the access link quality of one or more access links changes, if a new access link is detected, if a service requirement cannot be met by the current access link, if too many handovers occur at the current access technology, if the resource costs (processing, battery, power) are too high or, if large interference is detected for an access link;

if no critical criterion is fulfilled, going back to step 81;

if any critical criterion is fulfilled, determining an indication of how critical the situation is (step 83);

determining affected relevant sessions (step 84);

determining additional access agnostic parameters, e.g. bit rate in kb/s (step 85); and, sending CMF message to ASF (step 86) containing UTN identifier, possibly relevant sessions, type of critical situation or if it is a periodical update, possibly additional access agnostic parameters specifying the update/status, such as data rate in kb/s, and, possibly an indication of how critical the situation is;

if the CMF receives a request from the ASF for an access path status update message or if the CMF message is periodically sent to the ASF, performing steps 84-86 as shown on the left hand side of FIG. 8.

Figure 9:
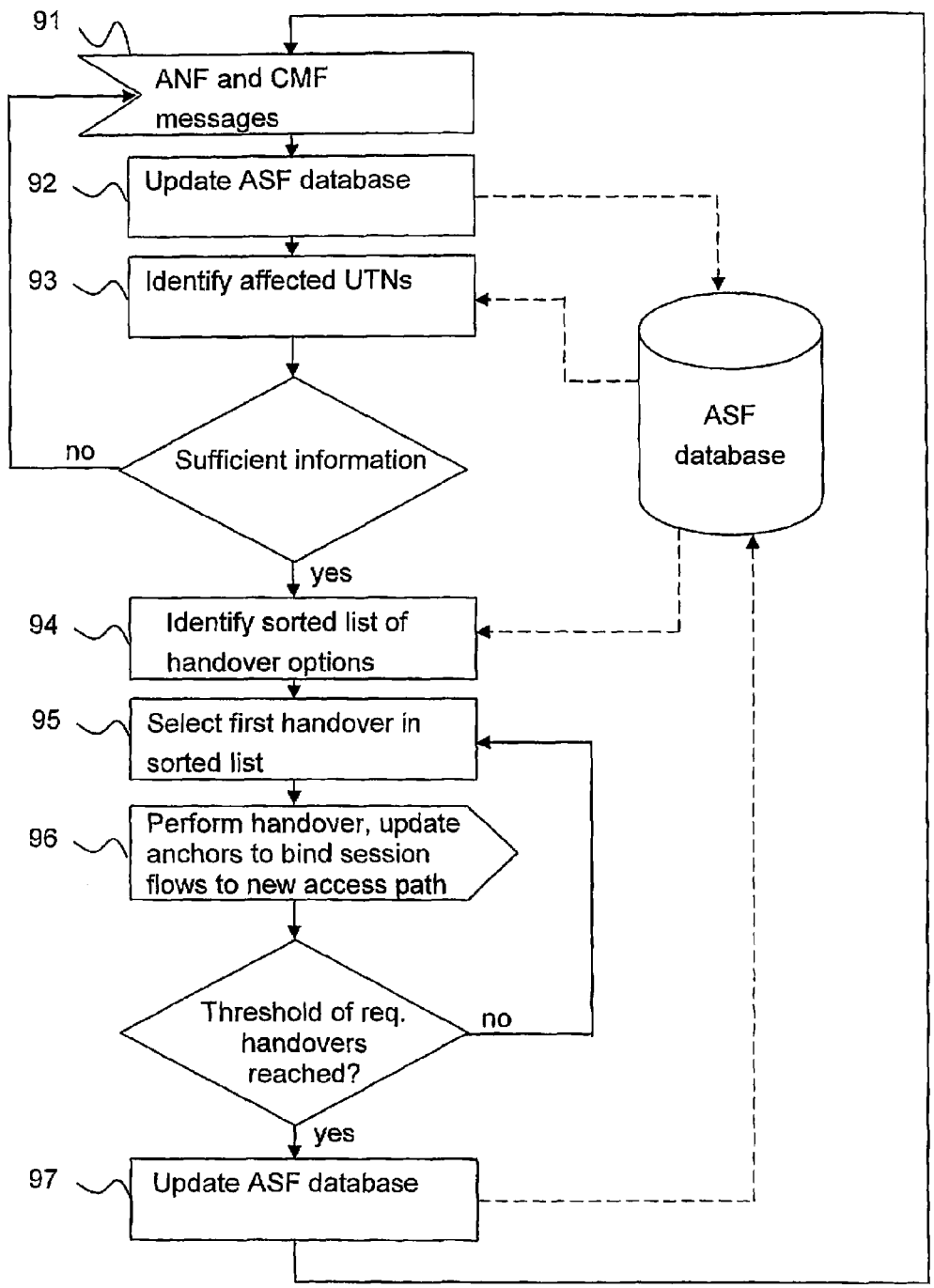
FIG. 9 is an exemplary flowchart showing the steps taken in the Access Selection Function (ASF) node.

In a preferred embodiment of the present invention, the procedure in the Access Selection Function (ASF), shown in FIG. 9, is as follows:

receiving ANF and CMF messages (step 91). The ANF message containing relevant UTNs and/or sessions (possibly pre-filtered), area identifiers and, an indication of how critical the situation is. The CMF message containing UTN identifier, possibly relevant sessions, type of critical situation or if it is a periodical update, possibly additional access agnostic parameters specifying the update/status, such as data rate in kb/s, and, possibly an indication of how critical the situation is;

updating ASF database (step 92) with received information;

identifying affected UTNs and/or sessions, i.e. candidates for handovers (step 93) using relevant information from the database;

checking if sufficient information for access selection is available and if parameters are up-to-date. If the check not is successful, requesting updating reports from one or more ANF and/or one or more CMF, i.e. going back to step 91;

identifying sorted list of handover options, i.e. possible alternative access paths, in priority order (step 94), using relevant information from the database;

selecting first handover (UTN and/or sessions) in sorted list and remove that handover from list (step 95);

performing handover of the selected UTN and/or session by updating the core and UTN anchors to bind session flows to new access path (step 96);

as long as a pre-determined threshold of requested handovers is not reached, selecting the first handover in the sorted list (step 95);

when the pre-determined threshold of requested handovers is reached, updating the ASF database (step 97).

Thus, according to a preferred embodiment of the present invention, the method for making a handover decision in a multi-access communication network comprising a core network and at least one user terminal network communicating with said core network on at least two access paths via at least two access networks, whereby data sessions are routed on at least a first access path via a first access network and a second access path via a second access network, comprises the following steps of:

determining a first set of criteria for when a handover between said at least two access paths should be performed;

sending a first report when at least one criterion of said first set of criteria is fulfilled;

determining a second set of criteria for when a handover between said at least two access paths should be performed;

sending a second report when at least one criterion of said second set of criteria is fulfilled;

determining one or more data sessions of said at least one user terminal network to be handed over based on at least one of the sent first and second report;

executing a handover by re-routing said determined data sessions from one access path to an alternative access path.

The present invention also comprises a computer program product, which is directly loadable into the internal memory of a digital computer, and which comprises a computer program for performing the inventive method when said program is run on said computer.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An arrangement for making a handover decision in a multi-access communication network comprising a core network and at least one user terminal network communicating with said core network on at least two access paths via at least two access networks, whereby data sessions are routed on at least a first access path via a first access network and a second access path via a second access network, wherein the arrangement comprises:

means for determining a first set of criteria for when a handover between said at least two access paths should be performed;

means for sending a first report when at least one criterion of said first set of criteria is fulfilled;

means for determining a second set of criteria for when a handover between said at least two access paths should be performed;

means for sending a second report when at least one criterion of said second set of criteria is fulfilled;

means for determining one or more data sessions of said at least one user terminal network to be handed over based on at least one of the sent first and second report;

means for executing a handover by re-routing said determined data sessions from one access path to an alternative access path.

2. An arrangement according to claim 1, wherein said means for determining the first set of criteria is an access network control function located in at least one of said at least two access networks.

3. An arrangement according to claim 1, wherein said means for determining the second set of criteria is a connection management function located in said at least one user terminal network.

4. An arrangement according to claim 1, wherein said means for determining one or more data sessions of said at least one user terminal network to be handed over is an access selection function.

5. An arrangement according to claim 4, wherein said access selection function is located in the core network.

6. An arrangement according to claim 4, wherein said access selection function is located in the user terminal network.

7. An arrangement according to claim 4, wherein said access selection function is arranged to request for first and second reports.

8. An arrangement according to claim 4, wherein said access selection function comprises means for establishing a list of possible said handover actions for affected user terminal network data sessions and means for sorting said list in priority order, whereby handovers are executed from said list in priority order until a threshold of required handover actions is met.

9. An arrangement according to claim 1, wherein the arrangement further comprises means for determining a third set of criteria for when a handover between said at least two access paths should be performed.

10. An arrangement according to claim 1, wherein said at least two access networks are at least two access network nodes located in one access network.

11. An arrangement in an access network for making a handover decision in a multi-access communication network comprising a core network and at least one user terminal network communicating with said core network on at least two access paths via at least two access network nodes, whereby data sessions are routed on at least a first access path via a first access network node and a second access path via a second access network node, wherein the arrangement comprises:
    means for determining a set of criteria for when a handover between said at least two access paths should be performed;
    means for sending a report to a superior access selection function node when at least one criterion of said set of criteria is fulfilled, whereby said access selection function node is arranged to determine one or more data sessions of said at least one user terminal network to be handed over based on said sent report.

12. An arrangement in a user terminal network for making a handover decision in a multi-access communication network comprising a core network and at least one user terminal network communicating with said core network on at least two access paths via at least two access networks, whereby data sessions are routed on at least a first access path via a first access network and a second access path via a second access network, wherein the arrangement comprises:
    means for determining a set of criteria for when a handover between said at least two access paths should be performed;
    means for sending a report to a superior access selection function node when at least one criterion of said set of criteria is fulfilled, whereby said access selection function node is arranged to determine one or more data sessions of said at least one user terminal network to be handed over based on said sent report.

13. An access selection function for making a handover decision in a multi-access communication network comprising a core network and at least one user terminal network communicating with said core network on at least two access paths via at least two access networks, whereby data sessions are routed on at least a first access path via a first access network and a second access path via a second access network, wherein the access selection function comprises:
    means for receiving a report if at least one criteria for when a handover between said at least two access paths should be performed is determined means for determining one or more data sessions of said at least one user terminal network to be handed over based on said sent report, whereby a handover is executed by re-routing said determined data sessions from one access path to an alternative access path.

14. An access selection function according to claim 13, wherein said access selection function is located in the core network.

15. An access selection function according to claim 13, wherein said access selection function is located in the user terminal network.

16. A method for making a handover decision in a multi-access communication network comprising a core network and at least one user terminal network communicating with said core network on at least two access paths via at least two access networks, whereby data sessions are routed on at least a first access path via a first access network and a second access path via a second access network wherein the method comprises the steps of:
    determining a first set of criteria for when a handover between said at least two access paths should be performed;
    sending a first report when at least one criterion of said first set of criteria is fulfilled;
    determining a second set of criteria for when a handover between said at least two access paths should be performed;
    sending a second report when at least one criterion of said second set of criteria is fulfilled;
    determining one or more data sessions of said at least one user terminal network to be handed over based on at least one of the sent first and second report;
    executing a handover by re-routing said determined data sessions from one access path to an alternative access path.

17. A method according to claim 16, wherein the step of determining a first set of criteria is performed by an access network control function located in at least one of said at least two access networks.

18. A method according to claim 16, wherein the step of determining a second set of criteria is performed by a connection management function located in said at least one user terminal network.

19. A method according to claim 16, wherein the step of determining one or more data sessions of said at least one user terminal network to be handed over is performed by an access selection function.

20. A method according to claim 16, wherein the method further comprises the step of determining a third set of criteria for when a handover between said at least two access paths should be performed.

21. A method according to claim 19, wherein said first and second reports are sent upon request by said access selection function.

22. A method according to claim 19, wherein said first and second reports are sent periodically to said access selection function.

23. A method according to claim 16, wherein the method further comprises the steps of:
    establishing a list of possible said handover actions for affected user terminal network data sessions; and,
    sorting said list in priority order, whereby handovers are executed from said list in priority order until a threshold of required handover actions is met.

24. A computer program product, which is directly loadable into the internal memory of a digital computer, and which comprises a computer program for performing the method of claim 16 when said program is run on said computer.

\* \* \* \* \*